US011586947B2

(12) United States Patent
Motohashi et al.

(10) Patent No.: US 11,586,947 B2
(45) Date of Patent: Feb. 21, 2023

(54) VISUALIZATION SYSTEM, VISUALIZATION METHOD, AND VISUALIZATION PROGRAM

(71) Applicant: NEC CORPORATION, Tokyo (JP)

(72) Inventors: Yousuke Motohashi, Tokyo (JP); Keisuke Umezu, Tokyo (JP); Azusa Washida, Tokyo (JP); Masashi Nakatomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 549 days.

(21) Appl. No.: 16/626,913

(22) PCT Filed: Jun. 29, 2017

(86) PCT No.: PCT/JP2017/023896
§ 371 (c)(1),
(2) Date: Dec. 27, 2019

(87) PCT Pub. No.: WO2019/003376
PCT Pub. Date: Jan. 3, 2019

(65) Prior Publication Data
US 2020/0125972 A1 Apr. 23, 2020

(51) Int. Cl.
*G06Q 30/00* (2012.01)
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2009/0089023 A1* | 4/2009 | Watanabe | ............. | G06Q 10/04 703/2 |
| 2013/0085998 A1* | 4/2013 | Barker | ................. | G06F 9/5088 707/649 |
| 2014/0188446 A1* | 7/2014 | Kimura | ............... | G06F 11/3447 703/2 |
| 2015/0088789 A1* | 3/2015 | Motohashi | ............. | G06N 20/00 706/12 |
| 2016/0063398 A1* | 3/2016 | Zhang | .................... | G06N 20/00 706/12 |

FOREIGN PATENT DOCUMENTS

| | | |
|---|---|---|
| JP | 2006-318249 A | 11/2006 |
| JP | 2016-115157 A | 6/2016 |
| JP | 2016-181060 A | 10/2016 |
| WO | 2016/088370 A1 | 6/2016 |

OTHER PUBLICATIONS

International Search Report for PCT/JP2017/023896 dated Aug. 1, 2017. [PCT/ISA/210].

* cited by examiner

*Primary Examiner* — Matthew T Sittner
(74) *Attorney, Agent, or Firm* — Sughrue Mion, PLLC

(57) ABSTRACT

A visualization system, in the case where a prediction target is expressed by a sum of a plurality of partial prediction targets, includes: a reception unit 81 for receiving designation of a method of compiling the partial prediction targets into a plurality of groups; a learning unit 82 for learning, for at least one of the groups, a model having, as an objective variable, a sum of partial prediction targets included in the group; and a first display control unit 83 for causing a display device to display parameters constituting the model.

7 Claims, 12 Drawing Sheets

FIG. 2

| ORDERER CODE | | LOCATION PREFECTURE | BUSINESS TYPE | NUMBER OF EMPLOYEES | PAST TRANSACTION |
|---|---|---|---|---|---|
| C-001 | COMPANY A | TOKYO | WHOLESALE | 1000 | 1 |
| C-002 | COMPANY B | CHIBA | TRANSPORTATION | 100 | 1 |
| C-003 | COMPANY C | TOKYO | FINANCE | 7000 | 1 |
| C-004 | COMPANY D | MIYAGI | WHOLESALE | 500 | 1 |
| C-005 | COMPANY E | KANAGAWA | CONSTRUCTION | 5000 | 0 |
| C-006 | COMPANY F | OSAKA | WHOLESALE | 2000 | 0 |
| C-007 | COMPANY G | TOKYO | MANUFACTURING | 10000 | 0 |
| C-008 | COMPANY H | AICHI | COMMUNICATION | 3000 | 1 |
| C-009 | COMPANY I | HOKKAIDO | RETAIL | 400 | 0 |
| C-010 | COMPANY J | FUKUOKA | REAL ESTATE | 200 | 1 |
| C-011 | COMPANY K | GIFU | SERVICE | 300 | 1 |
| C-012 | COMPANY L | NARA | REAL ESTATE | 100 | 0 |
| C-013 | COMPANY M | HIROSHIMA | MANUFACTURING | 4000 | 1 |
| C-014 | COMPANY N | KAGOSHIMA | MANUFACTURING | 2000 | 1 |
| C-015 | COMPANY O | KANAGAWA | INSURANCE | 500 | 1 |
| C-016 | COMPANY P | AICHI | FINANCE | 2000 | 1 |
| C-017 | COMPANY Q | AKITA | CONSTRUCTION | 200 | 0 |
| C-018 | COMPANY R | ISHIKAWA | TRANSPORTATION | 100 | 1 |
| C-019 | COMPANY S | OKINAWA | SERVICE | 600 | 1 |
| C-020 | COMPANY T | YAMANASHI | AGRICULTURE | 300 | 1 |
| C-021 | COMPANY U | TOKYO | FINANCE | 10000 | 1 |
| C-022 | COMPANY V | MIYAGI | RETAIL | 100 | 0 |
| C-023 | COMPANY W | FUKUOKA | INSURANCE | 200 | 1 |
| C-024 | COMPANY X | HYOGO | TRANSPORTATION | 100 | 1 |
| C-025 | COMPANY Y | YAMAGUCHI | MEDICINE | 300 | 1 |
| C-026 | COMPANY Z | TOKYO | SERVICE | 6000 | 1 |
| C-027 | COMPANY AA | OSAKA | FINANCE | 3000 | 1 |
| C-028 | COMPANY AB | NAGANO | FORESTRY | 100 | 1 |
| C-029 | COMPANY AC | KYOTO | INSURANCE | 300 | 0 |
| C-030 | COMPANY AD | TOTTORI | RETAIL | 100 | 1 |
| C-031 | COMPANY AE | FUKUSHIMA | MEDICINE | 200 | 1 |
| C-032 | COMPANY AF | NIIGATA | AGRICULTURE | 100 | 1 |

FIG. 3

| ORDER MONTH-YEAR | ORDER NUMBER | ORDERER CODE | NUMBER OF UNITS ORDERED | ORDERER NAME | NIKKEI STOCK AVERAGE MONTH-END CLOSING PRICE _3 MONTHS SHIFTING | NUMBER OF LISTED COMPANIES IN JAPAN 3 MONTHS SHIFTING | NUMBER OF UNITS REPAIRED LAST MONTH _3 MONTHS SHIFTING |
|---|---|---|---|---|---|---|---|
| APRIL 20xx | A-20xx-001 | C-001 | 100 | COMPANY A | 17000 | 3500 | 30 |
| APRIL 20xx | A-20xx-002 | C-023 | 45 | COMPANY W | 17000 | 3500 | 30 |
| APRIL 20xx | A-20xx-003 | C-005 | 55 | COMPANY E | 17000 | 3500 | 30 |
| APRIL 20xx | A-20xx-004 | C-017 | 62 | COMPANY Q | 17000 | 3500 | 30 |
| MAY 20xx | A-20xx-005 | C-027 | 52 | COMPANY AA | 17200 | 3520 | 10 |
| MAY 20xx | A-20xx-006 | C-030 | 42 | COMPANY AD | 17200 | 3520 | 10 |
| MAY 20xx | A-20xx-007 | C-001 | 100 | COMPANY A | 17200 | 3520 | 10 |
| MAY 20xx | A-20xx-008 | C-004 | 500 | COMPANY D | 17200 | 3520 | 10 |
| MAY 20xx | A-20xx-009 | C-018 | 29 | COMPANY R | 17200 | 3520 | 10 |
| JUNE 20xx | A-20xx-010 | C-002 | 20 | COMPANY B | 16800 | 3530 | 20 |
| JUNE 20xx | A-20xx-011 | C-011 | 10 | COMPANY K | 16800 | 3530 | 20 |
| JUNE 20xx | A-20xx-012 | C-015 | 51 | COMPANY O | 16800 | 3530 | 20 |
| JUNE 20xx | A-20xx-013 | C-004 | 500 | COMPANY D | 16800 | 3530 | 20 |
| JUNE 20xx | A-20xx-014 | C-025 | 47 | COMPANY Y | 16800 | 3530 | 20 |
| JUNE 20xx | A-20xx-015 | C-008 | 13 | COMPANY H | 16800 | 3530 | 20 |
| JULY 20xx | A-20xx-016 | C-001 | 100 | COMPANY A | 16500 | 3550 | 5 |
| JULY 20xx | A-20xx-017 | C-006 | 300 | COMPANY F | 16500 | 3550 | 5 |
| JULY 20xx | A-20xx-018 | C-019 | 109 | COMPANY S | 16500 | 3550 | 5 |
| AUGUST 20xx | A-20xx-019 | C-020 | 47 | COMPANY T | 16900 | 3560 | 25 |
| AUGUST 20xx | A-20xx-020 | C-031 | 45 | COMPANY AE | 16900 | 3560 | 25 |
| AUGUST 20xx | A-20xx-021 | C-010 | 44 | COMPANY J | 16900 | 3560 | 25 |
| AUGUST 20xx | A-20xx-022 | C-004 | 500 | COMPANY D | 16900 | 3560 | 25 |
| AUGUST 20xx | A-20xx-023 | C-014 | 15 | COMPANY N | 16900 | 3560 | 25 |
| SEPTEMBER 20xx | A-20xx-024 | C-022 | 31 | COMPANY V | 17000 | 3580 | 10 |
| SEPTEMBER 20xx | A-20xx-025 | C-001 | 100 | COMPANY A | 17000 | 3580 | 10 |
| SEPTEMBER 20xx | A-20xx-026 | C-004 | 500 | COMPANY D | 17000 | 3580 | 10 |
| SEPTEMBER 20xx | A-20xx-027 | C-006 | 300 | COMPANY F | 17000 | 3580 | 10 |
| SEPTEMBER 20xx | A-20xx-028 | C-021 | 47 | COMPANY U | 17000 | 3580 | 10 |
| SEPTEMBER 20xx | A-20xx-029 | C-009 | 32 | COMPANY I | 17000 | 3580 | 10 |
| SEPTEMBER 20xx | A-20xx-030 | C-028 | 12 | COMPANY AB | 17000 | 3580 | 10 |
| OCTOBER 20xx | A-20xx-031 | C-006 | 300 | COMPANY F | 17100 | 3590 | 30 |
| OCTOBER 20xx | A-20xx-032 | C-013 | 65 | COMPANY M | 17100 | 3590 | 30 |
| OCTOBER 20xx | A-20xx-033 | C-026 | 98 | COMPANY Z | 17100 | 3590 | 30 |
| NOVEMBER 20xx | A-20xx-034 | C-001 | 100 | COMPANY A | 16800 | 3610 | 5 |
| NOVEMBER 20xx | A-20xx-035 | C-006 | 300 | COMPANY F | 16800 | 3610 | 5 |
| NOVEMBER 20xx | A-20xx-036 | C-029 | 32 | COMPANY AC | 16800 | 3610 | 5 |
| NOVEMBER 20xx | A-20xx-037 | C-007 | 79 | COMPANY G | 16800 | 3610 | 5 |
| DECEMBER 20xx | A-20xx-038 | C-003 | 68 | COMPANY C | 17000 | 3620 | 10 |
| DECEMBER 20xx | A-20xx-039 | C-024 | 43 | COMPANY X | 17000 | 3620 | 10 |
| DECEMBER 20xx | A-20xx-040 | C-004 | 500 | COMPANY D | 17000 | 3620 | 10 |
| DECEMBER 20xx | A-20xx-041 | C-006 | 300 | COMPANY F | 17000 | 3620 | 10 |
| DECEMBER 20xx | A-20xx-042 | C-012 | 11 | COMPANY L | 17000 | 3620 | 10 |

FIG. 4

| TOTAL / NUMBER OF UNITS ORDERED | | | | |
|---|---|---|---|---|
| MONTH-YEAR | SUM TOTAL | NIKKEI STOCK AVERAGE_MONTH-END CLOSING PRICE_3 MONTHS SHIFTING | NUMBER OF LISTED COMPANIES IN JAPAN_3 MONTHS SHIFTING | NUMBER OF UNITS REPAIRED LAST MONTH_3 MONTHS SHIFTING |
| APRIL 20xx | 262 | 17000 | 3500 | 30 |
| MAY 20xx | 723 | 17200 | 3520 | 10 |
| JUNE 20xx | 641 | 16800 | 3530 | 20 |
| JULY 20xx | 509 | 16500 | 3550 | 5 |
| AUGUST 20xx | 651 | 16900 | 3560 | 25 |
| SEPTEMBER 20xx | 1022 | 17000 | 3580 | 10 |
| OCTOBER 20xx | 463 | 17100 | 3590 | 30 |
| NOVEMBER 20xx | 511 | 16800 | 3610 | 5 |
| DECEMBER 20xx | 922 | 17000 | 3620 | 10 |

FIG. 5

| ORDER MONTH-YEAR | ORDER NUMBER | GROUP | ORDERER CODE | NUMBER OF UNITS ORDERED | ORDERER NAME | NIKKEI STOCK AVERAGE MONTH-END CLOSING PRICE 3 MONTHS SHIFTING | NUMBER OF LISTED COMPANIES IN JAPAN 3 MONTHS SHIFTING | NUMBER OF UNITS REPAIRED LAST MONTH 3 MONTHS SHIFTING |
|---|---|---|---|---|---|---|---|---|
| APRIL 20xx | A-20xx-001 | Y1 | C-001 | 100 | COMPANY A | 17000 | 3500 | 30 |
| APRIL 20xx | A-20xx-002 | Y2 | C-023 | 45 | COMPANY W | 17000 | 3500 | 30 |
| APRIL 20xx | A-20xx-003 | Y2 | C-005 | 55 | COMPANY E | 17000 | 3500 | 30 |
| APRIL 20xx | A-20xx-004 | Y2 | C-017 | 62 | COMPANY Q | 17000 | 3500 | 30 |
| MAY 20xx | A-20xx-005 | Y2 | C-027 | 52 | COMPANY AA | 17200 | 3520 | 10 |
| MAY 20xx | A-20xx-006 | Y2 | C-030 | 42 | COMPANY AD | 17200 | 3520 | 10 |
| MAY 20xx | A-20xx-007 | Y1 | C-001 | 100 | COMPANY A | 17200 | 3520 | 10 |
| MAY 20xx | A-20xx-008 | Y1 | C-004 | 500 | COMPANY D | 17200 | 3520 | 10 |
| MAY 20xx | A-20xx-009 | Y2 | C-018 | 29 | COMPANY R | 17200 | 3520 | 10 |
| JUNE 20xx | A-20xx-010 | Y2 | C-002 | 20 | COMPANY B | 16800 | 3530 | 20 |
| JUNE 20xx | A-20xx-011 | Y2 | C-011 | 10 | COMPANY K | 16800 | 3530 | 20 |
| JUNE 20xx | A-20xx-012 | Y2 | C-015 | 51 | COMPANY O | 16800 | 3530 | 20 |
| JUNE 20xx | A-20xx-013 | Y1 | C-004 | 500 | COMPANY D | 16800 | 3530 | 20 |
| JUNE 20xx | A-20xx-014 | Y2 | C-025 | 47 | COMPANY Y | 16800 | 3530 | 20 |
| JUNE 20xx | A-20xx-015 | Y2 | C-008 | 13 | COMPANY H | 16800 | 3530 | 20 |
| JULY 20xx | A-20xx-016 | Y1 | C-001 | 100 | COMPANY A | 16500 | 3550 | 5 |
| JULY 20xx | A-20xx-017 | Y1 | C-006 | 300 | COMPANY F | 16500 | 3550 | 5 |
| JULY 20xx | A-20xx-018 | Y2 | C-019 | 109 | COMPANY S | 16500 | 3550 | 5 |
| AUGUST 20xx | A-20xx-019 | Y2 | C-020 | 47 | COMPANY T | 16900 | 3560 | 25 |
| AUGUST 20xx | A-20xx-020 | Y2 | C-031 | 45 | COMPANY AE | 16900 | 3560 | 25 |
| AUGUST 20xx | A-20xx-021 | Y2 | C-010 | 44 | COMPANY J | 16900 | 3560 | 25 |
| AUGUST 20xx | A-20xx-022 | Y1 | C-004 | 500 | COMPANY D | 16900 | 3560 | 25 |
| AUGUST 20xx | A-20xx-023 | Y2 | C-014 | 15 | COMPANY N | 16900 | 3560 | 25 |
| SEPTEMBER 20xx | A-20xx-024 | Y2 | C-022 | 31 | COMPANY V | 17000 | 3580 | 10 |
| SEPTEMBER 20xx | A-20xx-025 | Y1 | C-001 | 100 | COMPANY A | 17000 | 3580 | 10 |
| SEPTEMBER 20xx | A-20xx-026 | Y1 | C-004 | 500 | COMPANY D | 17000 | 3580 | 10 |
| SEPTEMBER 20xx | A-20xx-027 | Y1 | C-006 | 300 | COMPANY F | 17000 | 3580 | 10 |
| SEPTEMBER 20xx | A-20xx-028 | Y2 | C-021 | 47 | COMPANY U | 17000 | 3580 | 10 |
| SEPTEMBER 20xx | A-20xx-029 | Y2 | C-009 | 32 | COMPANY I | 17000 | 3580 | 10 |
| SEPTEMBER 20xx | A-20xx-030 | Y2 | C-028 | 12 | COMPANY AB | 17000 | 3580 | 10 |
| OCTOBER 20xx | A-20xx-031 | Y1 | C-006 | 300 | COMPANY F | 17100 | 3590 | 30 |
| OCTOBER 20xx | A-20xx-032 | Y2 | C-013 | 65 | COMPANY M | 17100 | 3590 | 30 |
| OCTOBER 20xx | A-20xx-033 | Y2 | C-026 | 98 | COMPANY Z | 17100 | 3590 | 30 |
| NOVEMBER 20xx | A-20xx-034 | Y1 | C-001 | 100 | COMPANY A | 16800 | 3610 | 5 |
| NOVEMBER 20xx | A-20xx-035 | Y1 | C-006 | 300 | COMPANY F | 16800 | 3610 | 5 |
| NOVEMBER 20xx | A-20xx-036 | Y2 | C-029 | 32 | COMPANY AC | 16800 | 3610 | 5 |
| NOVEMBER 20xx | A-20xx-037 | Y2 | C-007 | 79 | COMPANY G | 16800 | 3610 | 5 |
| DECEMBER 20xx | A-20xx-038 | Y2 | C-003 | 68 | COMPANY C | 17000 | 3620 | 10 |
| DECEMBER 20xx | A-20xx-039 | Y2 | C-024 | 43 | COMPANY X | 17000 | 3620 | 10 |
| DECEMBER 20xx | A-20xx-040 | Y1 | C-004 | 500 | COMPANY D | 17000 | 3620 | 10 |
| DECEMBER 20xx | A-20xx-041 | Y1 | C-006 | 300 | COMPANY F | 17000 | 3620 | 10 |
| DECEMBER 20xx | A-20xx-042 | Y2 | C-012 | 11 | COMPANY L | 17000 | 3620 | 10 |

| TOTAL / NUMBER OF UNITS ORDERED | | | | |
|---|---|---|---|---|
| MONTH-YEAR | Y1 | NIKKEI STOCK AVERAGE_ MONTH-END CLOSING PRICE_3 MONTHS SHIFTING | NUMBER OF LISTED COMPANIES IN JAPAN_3 MONTHS SHIFTING | NUMBER OF UNITS REPAIRED LAST MONTH_3 MONTHS SHIFTING |
| APRIL 20xx | 100 | 17000 | 3500 | 30 |
| MAY 20xx | 600 | 17200 | 3520 | 10 |
| JUNE 20xx | 500 | 16800 | 3530 | 20 |
| JULY 20xx | 400 | 16500 | 3550 | 5 |
| AUGUST 20xx | 500 | 16900 | 3560 | 25 |
| SEPTEMBER 20xx | 900 | 17000 | 3580 | 10 |
| OCTOBER 20xx | 300 | 17100 | 3590 | 30 |
| NOVEMBER 20xx | 400 | 16800 | 3610 | 5 |
| DECEMBER 20xx | 800 | 17000 | 3620 | 10 |

D2

| TOTAL / NUMBER OF UNITS ORDERED | | | | |
|---|---|---|---|---|
| MONTH-YEAR | Y2 | NIKKEI STOCK AVERAGE_ MONTH-END CLOSING PRICE_3 MONTHS SHIFTING | NUMBER OF LISTED COMPANIES IN JAPAN_3 MONTHS SHIFTING | NUMBER OF UNITS REPAIRED LAST MONTH_3 MONTHS SHIFTING |
| APRRIL 20xx | 162 | 17000 | 3500 | 30 |
| MAY 20xx | 123 | 17200 | 3520 | 10 |
| JUNE 20xx | 141 | 16800 | 3530 | 20 |
| JULY 20xx | 109 | 16500 | 3550 | 5 |
| AUGUST 20xx | 151 | 16900 | 3560 | 25 |
| SEPTEMBER 20xx | 122 | 17000 | 3580 | 10 |
| OCTOBER 20xx | 163 | 17100 | 3590 | 30 |
| NOVEMBER 20xx | 111 | 16800 | 3610 | 5 |
| DECEMBER 20xx | 122 | 17000 | 3620 | 10 |

FIG. 7

| TOTAL / NUMBER OF UNITS ORDERED | | | | | | |
|---|---|---|---|---|---|---|
| MONTH-YEAR | Y2 | Y1 | NIKKEI STOCK AVERAGE_MONTH-END CLOSING PRICE_3 MONTHS SHIFTING | NUMBER OF LISTED COMPANIES IN JAPAN_3 MONTHS SHIFTING | NUMBER OF UNITS REPAIRED LAST MONTH_3 MONTHS SHIFTING | Y2 PREDICTION VALUE |
| APRIL 20xx | 182 | 100 | 17000 | 3500 | 30 | 180.5 |
| MAY 20xx | 123 | 600 | 17200 | 3520 | 10 | 121.64 |
| JUNE 20xx | 141 | 500 | 16800 | 3530 | 20 | 149.46 |
| JULY 20xx | 109 | 400 | 16500 | 3550 | 5 | 102.85 |
| AUGUST 20xx | 151 | 500 | 16900 | 3560 | 25 | 165.07 |
| SEPTEMBER 20xx | 122 | 900 | 17000 | 3580 | 10 | 120.66 |
| OCTOBER 20xx | 163 | 300 | 17100 | 3590 | 30 | 181.23 |
| NOVEMBER 20xx | 111 | 400 | 16800 | 3610 | 5 | 104.62 |
| DECEMBER 20xx | 122 | 800 | 17000 | 3620 | 10 | 120.74 |
| JANUARY 20xy | | 200 | 17300 | 3450 | 40 | 212.05 |
| FEBRUARY 20xy | | 400 | 17200 | 3500 | 30 | 181.6 |
| MARCH 20xy | | 300 | 17600 | 3650 | 10 | 124.1 |

D3

VISUALIZATION SYSTEM, VISUALIZATION METHOD, AND VISUALIZATION PROGRAM

CROSS REFERENCE TO RELATED APPLICATIONS

This application is a National Stage of International Application No. PCT/JP2017/023896 filed Jun. 29, 2017.

TECHNICAL FIELD

The present invention relates to a visualization system, a visualization method, and a visualization program for visualizing prediction result data in the case where a plurality of prediction targets are grouped.

BACKGROUND ART

To obtain a prediction result as a whole, instead of generating a prediction model for each individual target, a plurality of targets may be grouped to perform prediction for each group.

For example, Patent Literature (PTL) 1 describes a method of constructing a model for demand prediction. With the method described in PTL 1, a plurality of contract units are classified into any number of groups based on a feature of demand that changes in chronological order and corresponds to each element capable of influencing the demand regarding the contract unit. A prediction model that is a demand model is then constructed for each group, and the constructed prediction model and a prediction model list that is a list of the prediction models of the groups are output. For each prediction model in the prediction model list, demand in the prediction model is predicted, and all predicted demands are combined to calculate total demand prediction and the calculated total demand prediction is output.

CITATION LIST

Patent Literature

PTL 1: International Patent Application Publication No. 2016/088370

SUMMARY OF INVENTION

Technical Problem

Even in the case where there are a plurality of customers having different demand tendencies, an appropriate prediction model can be constructed by grouping the plurality of customers to perform total demand prediction as in the method described in PTL 1. However, PTL 1 does not suggest visualizing a prediction model of each group or visualizing a basis of prediction. Thus, in the case where a prediction model is simply used to obtain a prediction result, it is difficult for an analyst or an administrator to determine whether the obtained result is appropriate.

It is therefore preferable that, in the case where a desired prediction target is expressed by a sum of a plurality of prediction targets, a basis of prediction is visualized in a form recognizable by a user.

The present invention therefore has an object of providing a visualization system, a visualization method, and a visualization program capable of visualizing a basis of prediction in the case where a desired prediction target is expressed by a sum of a plurality of prediction targets.

Solution to Problem

A visualization system according to the present invention, in the case where a prediction target is expressed by a sum of a plurality of partial prediction targets, includes: a reception unit which receives designation of a method of compiling the partial prediction targets into a plurality of groups; a learning unit which learns, for at least one of the groups, a model having, as an objective variable, a sum of partial prediction targets included in the group; and a first display control unit which causes a display device to display parameters constituting the model.

A visualization method according to the present invention, in the case where a prediction target is expressed by a sum of a plurality of partial prediction targets, includes: receiving designation of a method of compiling the partial prediction targets into a plurality of groups; learning, for at least one of the groups, a model having, as an objective variable, a sum of partial prediction targets included in the group; and causing a display device to display parameters constituting the model.

A visualization program according to the present invention, in the case where a prediction target is expressed by a sum of a plurality of partial prediction targets, causes a computer to execute: a reception process of receiving designation of a method of compiling the partial prediction targets into a plurality of groups; a learning process of learning, for at least one of the groups, a model having, as an objective variable, a sum of partial prediction targets included in the group; and a first display control process of causing a display device to display parameters constituting the model.

Advantageous Effects of Invention

The present invention has a technical effect of visualizing a basis of prediction in the case where a desired prediction target is expressed by a sum of a plurality of prediction targets.

BRIEF DESCRIPTION OF DRAWINGS

FIG. 2 is an explanatory diagram depicting an example of candidates for partial prediction targets.

FIG. 3 is an explanatory diagram depicting an example of performance data.

FIG. 4 is an explanatory diagram depicting an example of summarizing performance data.

FIG. 5 is an explanatory diagram depicting an example of classifying candidates for partial prediction targets.

FIG. 6 is an explanatory diagram depicting an example of summarizing past performance data for each group.

FIG. 7 is an explanatory diagram depicting an example of a method of calculating a prediction value for each group based on prediction data.

DESCRIPTION OF EMBODIMENT

Figure 1:
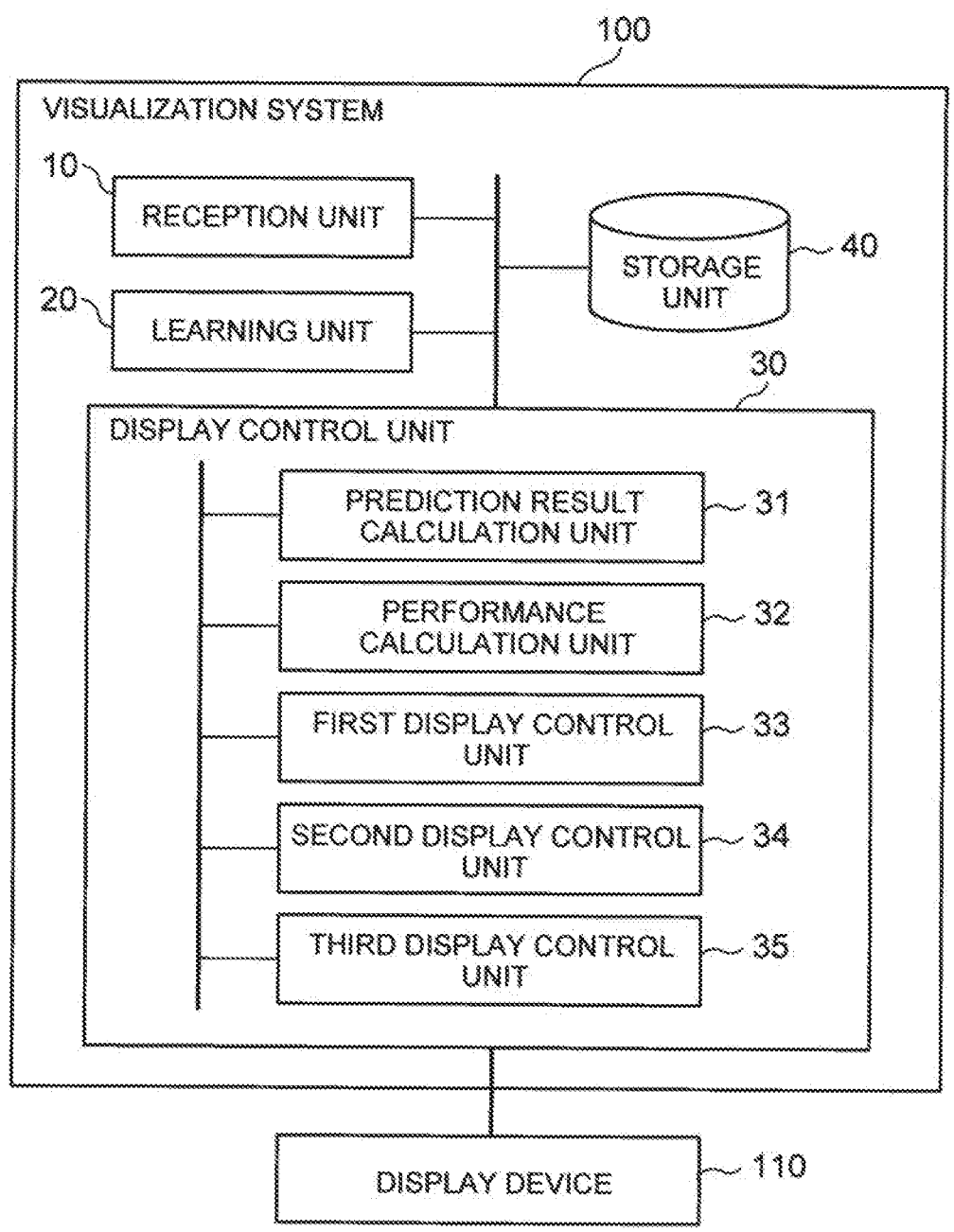
FIG. 1 is a block diagram depicting an exemplary embodiment of a visualization system according to the present invention.

An exemplary embodiment of the present invention will be described below, with reference to the drawings. FIG. 1 is a block diagram depicting an exemplary embodiment of a visualization system according to the present invention. The structure of the visualization system according to this exemplary embodiment will be described later.

In the present invention, a value (prediction result) of a prediction target Y at a time is made up of a sum of a plurality of prediction targets $y_1, y_2, \ldots, y_n$ at the time. That is, a prediction target at a time is expressed by a sum of a plurality of partial prediction targets at the time. Specifically, $Y = y_1 + y_2 + \ldots + y_n$.

Given that the desired prediction target Y is made up of the sum of the plurality of prediction targets $y_1, y_2, \ldots, y_n$, each of the prediction targets $y_1, y_2, \ldots, y_n$ is hereafter referred to as a partial prediction target. Thus, the value of the prediction target Y at a time is calculated as a sum total of the partial prediction targets $y_1, y_2, \ldots, y_n$ at the time. For example, in the case where the prediction target Y is the total demand (the total number of orders) for a server, each partial prediction target $y_n$ is the server demand (the number of orders) of an individual client.

In the present invention, the partial prediction targets are compiled into a plurality of groups $(Y_1, Y_2, \ldots, Y_N)$, and learning of a prediction model and calculation of a prediction value and a performance value of the prediction target are performed for each group.

The relationship between the prediction target and the partial prediction targets will be described below, using a specific example. Suppose there is a factory for assembling and delivering a server, and the future demand (the number of orders) for the server is predicted based on past order history and the like from the standpoint of a production management division of the factory.

FIG. 2 is an explanatory diagram depicting an example of candidates for partial prediction targets. In the example in FIG. 2, the factory deals with 32 companies of company A to company AF in FIG. 2. FIG. 3 is an explanatory diagram depicting an example of the number of units ordered for the server for each month and for each client, as performance data. The table in FIG. 3 includes the month-end Nikkei stock average and the number of listed companies three months ago and the number of servers (units) repaired four months ago. Actually acquired past data (performance data) as depicted in FIG. 3 is hereafter also referred to as evaluation data.

Consider the case of predicting the number of orders for the server in the next month when such information is available. For example, with a typical method, a prediction model is learned with the total number of orders for the server for each company and for each month being set as an objective variable and the Nikkei stock average, the number of listed companies, the number of servers (units) repaired, etc. included in the table in FIG. 3 being set as an explanatory variable.

FIG. 4 is an explanatory diagram depicting an example of summarizing the performance data depicted in FIG. 3. By performing learning using the data depicted in FIG. 4, a prediction model for predicting the number of orders for the server can be generated. However, for example, there is a possibility that the clients of the 32 companies include clients (e.g. large clients, unexpected orderers) having significantly different property from other clients. If learning is performed in a manner in which these clients having different properties are lumped together, high prediction accuracy is unlikely to be achieved.

It is possible to classify such plurality of clients from a certain perspective. For example, there is a possibility that high prediction accuracy is achieved by performing learning and prediction separately for the number of units ordered by large clients for each month and the number of units ordered by the other clients for each month. In this specific example, from such perspective, the order prediction value of the large clients for each month and the order prediction value of the other clients for each month are predicted separately, and lastly the values of these companies are added together to yield the order prediction value for each month.

FIG. 5 is an explanatory diagram depicting an example of classifying the candidates for partial prediction targets. In the example in FIG. 5, of the clients depicted in FIG. 3, companies A, D, and F are classified as group $Y_1$ as clients (large clients) whose business type is wholesale, and the other clients are classified as group $Y_2$.

The following will describe a method of compiling partial prediction targets into two groups, for simplicity's sake. However, the number of groups into which partial prediction targets are compiled is not limited to two, and may be three or more. The structure of the visualization system according to this exemplary embodiment will be described below, using the foregoing specific example as appropriate.

A visualization system 100 depicted in FIG. 1 includes a reception unit 10, a learning unit 20, a display control unit 30, and a storage unit 40.

The storage unit 40 stores information relating to partial prediction targets. For example, the storage unit 40 may store partial prediction targets such as the clients depicted in FIG. 2. The storage unit 40 may store performance data relating to the partial prediction targets as depicted in FIG. 3. The storage unit 40 may store prediction values estimated beforehand for the partial prediction targets, instead of prediction values using the below-described model. The estimated prediction values are, for example, values calculated by another system or the like.

The information stored in the storage unit 40 is not limited to the above. The storage unit 40 may store, for example, a model generated as a result of learning by the below-described learning unit 20. The storage unit 40 is implemented by, for example, a magnetic disk device.

The reception unit 10 receives designation of a method of compiling the partial prediction targets into a plurality of groups. The designation of the compiling method may be any information. As an example, the reception unit 10 may receive designation of a threshold of an evaluation item in order to separate the groups. In this case, the partial prediction targets are divided into the groups depending on the threshold. As another example, the reception unit 10 may receive designation of a value of an evaluation item. In this case, the partial prediction targets are divided between partial prediction targets matching the designated value and the other partial prediction targets.

As another example, the reception unit 10 may directly receive designation of partial prediction targets to be grouped together. The designation received by the reception unit 10 is, however, not limited to the above, and may be any information as long as the method of compiling the partial prediction targets into the groups can be identified.

The reception unit 10 may receive designation of a learning method performed by the below-described learning unit 20. Here, the reception unit 10 may receive designation of a learning method different for each group, or designation of a learning method commonly performed for the groups by the learning unit 20.

The reception unit 10 may determine designation of the method of compiling into the plurality of groups, according to operation or information input from the user via the below-described display device 110. Input via the display device 110 will be described later.

The learning unit 20, for at least one group of partial prediction targets compiled according to the designation received by the reception unit 10, learns a model having a sum of the partial prediction targets included in the group as an objective variable. For example, suppose the partial prediction targets are classified into the two groups $Y_1$ and $Y_2$ as depicted in FIG. 5. Since the companies other than companies A, D, and F are classified as $Y_2$, the learning unit 20 learns a model having, as an objective variable, a sum of server demands of the clients other than companies A, D, and F.

The learning unit 20 summarizes performance data of each divided group to generate evaluation data. FIG. 6 is an explanatory diagram depicting an example of summarizing past performance data for each group. In the example in FIG. 6, the performance value of each of the groups $Y_1$ and $Y_2$ for each month is summarized to generate evaluation data.

For example, in the case of learning a model for predicting server demand for the group $Y_2$, the learning unit 20 learns the model using generated evaluation data D2. As a result of learning the model for the group $Y_2$ using the evaluation data D2, for example, the following Formula 1 is yielded.

Sales for each month=Nikkei stock average_month-end closing price_3 months shifting×0.0055+number of listed companies in Japan_3months shifting×0.002+number of units repaired last month_3 months shifting×3-10       (Formula 1).

The learning unit 20 may perform learning by any method. The learning unit 20 may learn the model based on a learning method set beforehand. Specifically, the learning unit 20 may learn a linear multiple regression model. By learning the prediction model by a linear multiple regression model, the influence of each explanatory variable can be determined easily, with it being possible to improve user interpretation. The learning unit 20 may learn the model based on a learning method designated by the above-described reception unit 10.

In the case where the prediction values of the partial prediction targets included in the group are estimated beforehand by another method or the like, on the other hand, the learning unit 20 need not learn the model for the group of the partial prediction targets. For example, the numbers of orders by the clients included in the group $Y_1$ in FIG. 5 can be recognized from a past empirical rule or the like, and machine learning need not be performed for the group $Y_1$. This corresponds to, for example, the case where it is known that, of the companies included in the group $Y_1$, company A demands 100 servers each time, company D demands 500 servers each time, and company F demands 300 servers each time. For example, in the case where prediction values estimated beforehand for the partial prediction targets included in the group are stored in the storage unit 40, the learning unit 20 may determine that there is no need to learn the model.

The learning unit 20 may generate models based on a plurality of types of learning methods and not based on only one type of learning method, and select a model from the generated models based on a predetermined criterion. Examples of the predetermined criterion include prediction accuracy and learning time.

The display control unit 30 includes a prediction result calculation unit 31, a performance calculation unit 32, a first display control unit 33, a second display control unit 34, and a third display control unit 35.

The prediction result calculation unit 31 calculates a sum of prediction values calculated for the respective groups, as a prediction result of the prediction target. Specifically, the prediction result calculation unit 31 calculates each prediction value by applying prediction data to the model, and calculates a sum of prediction values of the respective groups as the prediction result of the prediction target.

FIG. 7 is an explanatory diagram depicting an example of a method of calculating a prediction value of a group based on prediction data. In the example in FIG. 7, prediction data D3 in FIG. 7 is applied to the model generated for the group $Y_2$ to calculate a prediction value. For example, as a result of applying the prediction data to the model indicated by the foregoing Formula 1, the server demand of the group $Y_2$ in January 20xy is predicated to be 212.05 units.

In the case of a group for which an estimate determined beforehand is used as a prediction value without using a model, the prediction result calculation unit 31 calculates a prediction value using the estimate. In the example in FIG. 7, the estimate for the group $Y_1$ is known, so that the prediction value is set for each month.

The performance calculation unit 32 summarizes a performance value of the prediction target for each group, based on past performance data. For example, the performance calculation unit 32 may summarize the performance data depicted in FIG. 3 for each group to calculate a performance value.

The first display control unit 33 causes the display device 110 to display parameters constituting the model, for each group. For example, in the case where the model is learned as a linear multiple regression model, the first display control unit 33 may cause the display device 110 to display coefficients and explanatory variables constituting the linear multiple regression model.

In the case of a group for which an estimate determined beforehand is used as a prediction value without using a model, the first display control unit 33 may cause the display device 110 to display information that the model uses the estimate determined beforehand as the prediction value.

The second display control unit 34 causes the display device 110 to display the prediction result calculated by the prediction result calculation unit 31. Here, the second display control unit 34 causes the display device 110 to display, as a breakdown of the prediction result, the prediction value of each group in a distinguishable form. Each prediction value may be distinguished in any form. For example, the second display control unit 34 may display the prediction value of each group in a cumulative bar graph or in a line graph.

The second display control unit 34 may cause the display device 110 to display not only the prediction result but also the performance value of each group summarized by the performance calculation unit 32 in a distinguishable form.

In this exemplary embodiment, the prediction target at a time is expressed by the sum of the plurality of partial prediction targets at the time. Hence, the second display control unit 34 may cause the display device 110 to display a graph having one axis (e.g. x axis) as a time axis and the other axis (e.g. y axis) representing the prediction target.

Figure 8:
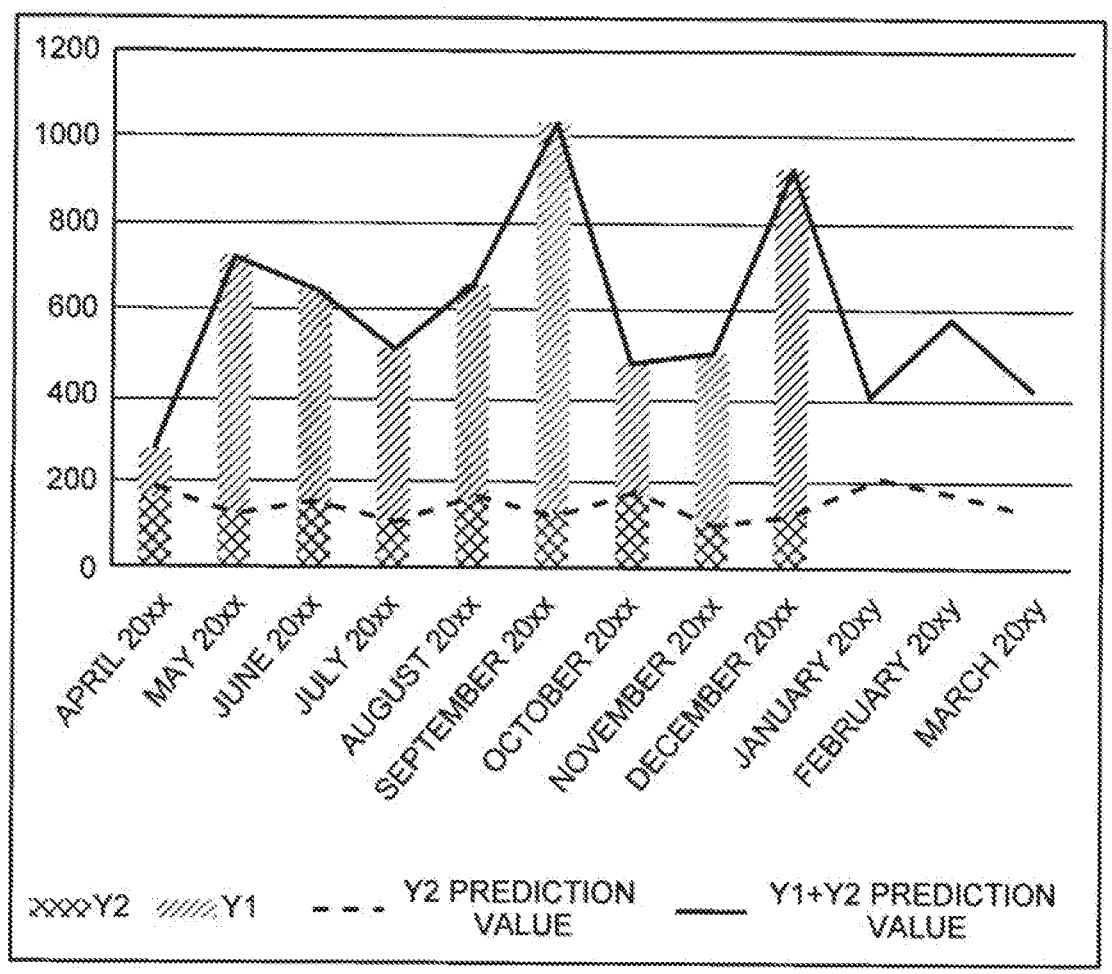
FIG. 8 is an explanatory diagram depicting an example of display of a prediction result and a performance value.

FIG. 8 is an explanatory diagram depicting an example of display of a prediction result and a performance value. In the example in FIG. 8, the result of predicting server demand from January 20xy onward is displayed, and the past performance values and the prediction values from December 20xx backward are displayed. In the example in FIG. 8, the performance values of the groups $Y_1$ and $Y_2$ are displayed in different bar graph patterns and the prediction values of the groups $Y_1$ and $Y_2$ are displayed in different line forms so that the groups are distinguishable from each other.

The third display control unit 35 causes the display device 110 to display the reception unit 10, in order to receive designation of a method of compiling into groups from the user. For example, the third display control unit 35 may cause the display device 110 to display an object operable through a pointing device such as a mouse, as one form of the reception unit 10. The third display control unit 35 preferably displays the reception unit 10 in a state in which the graph and the object are near enough to be visible to the user simultaneously, to enable the user to reference the reception unit 10 and the graph at the same time.

Figure 9:
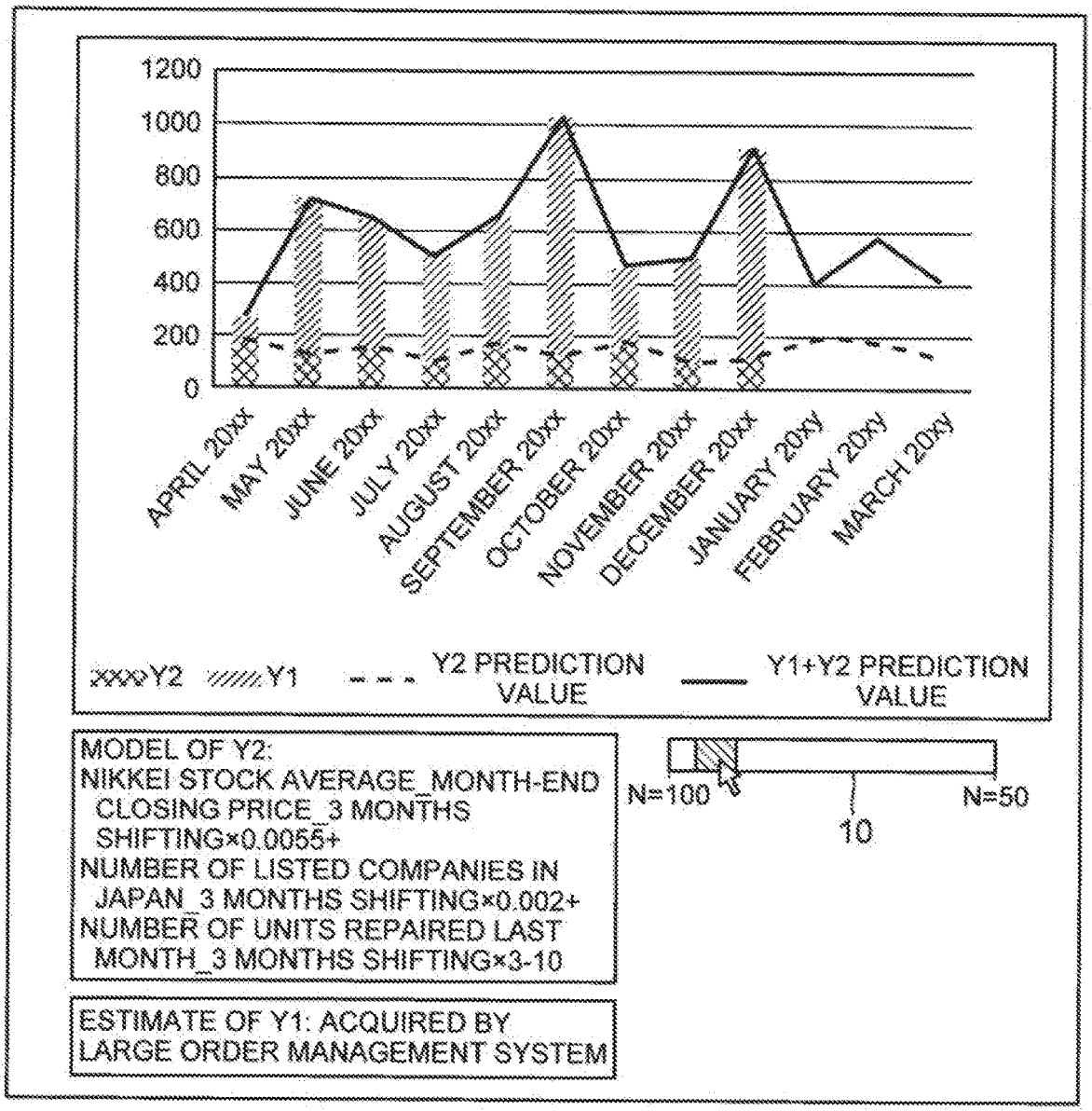
FIG. 9 is an explanatory diagram depicting an example of display by a display device.

FIG. 9 is an explanatory diagram depicting an example of display by the display device 110. In the example in FIG. 9, the reception unit 10 for receiving designation of a threshold for dividing partial prediction targets is displayed near the graph depicted in FIG. 8. The reception unit 10 in FIG. 9 receives designation of a threshold for classifying clients in the top N % in server demand as the group $Y_1$ and the other clients as the group $Y_2$. By adjusting the value of N using the reception unit 10 represented as a slide bar, the groups $Y_1$ and $Y_2$ are defined and updated in real time.

In the example in FIG. 9, the model for the group $Y_2$ is displayed as a linear regression equation, as an example of the parameters constituting the model.

Figure 10:
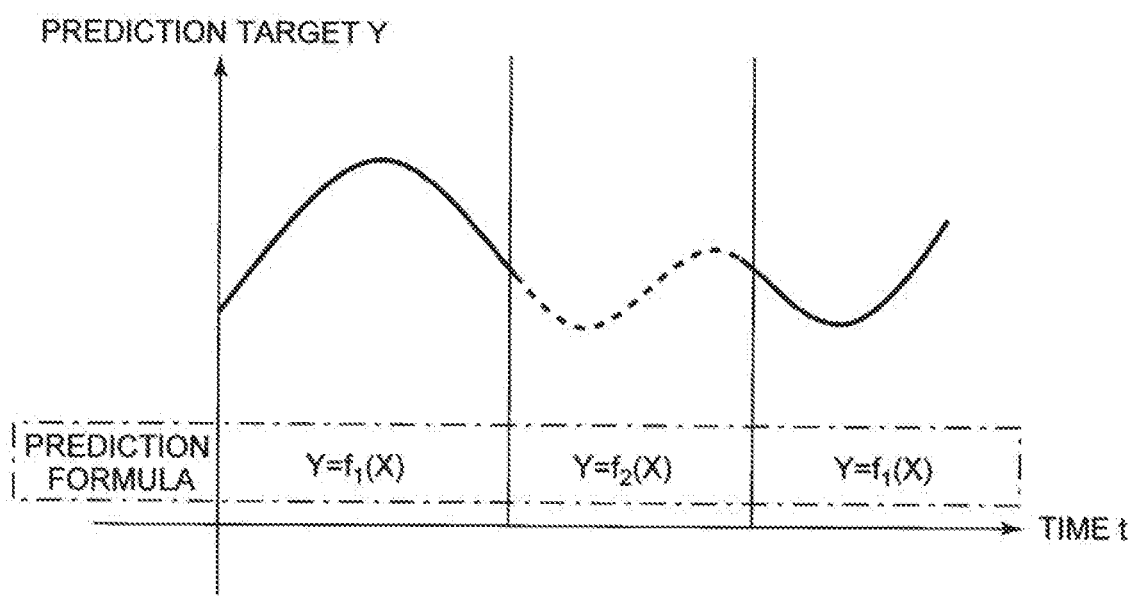
FIG. 10 is an explanatory diagram depicting an example of typical data analysis.

As is clear from the graph depicted in FIG. 8, a situation assumed in the present invention is different from a typical data analysis situation. FIG. 10 is an explanatory diagram depicting an example of typical data analysis. A learning model used in a prediction process in typical data analysis is selected based on a feature that changes in chronological order. For example, suppose a prediction target Y is expressed by a formula including a variable (explanatory variable) X indicating a feature, and $Y=f_1(X)$ is selected as a prediction formula in the case where $X>A$ and $Y=f_2(X)$ is selected as a prediction formula in the case where $X \leq A$.

In such a case, a prediction formula is specified in each section in chronological order, and prediction is performed based on the prediction formula, as depicted in FIG. 10. In the present invention, on the other hand, a value of a prediction target Y at a time is expressed by a sum of partial prediction targets $y_1, y_2, \ldots, y_n$ at the time. Therefore, the value of the prediction target can be expressed by a graph (e.g. bar graph) relating to a given time, as depicted in FIG. 8.

The reception unit 10, the learning unit 20, and the display control unit 30 (more specifically, the prediction result calculation unit 31, the performance calculation unit 32, the first display control unit 33, the second display control unit 34, and the third display control unit 35) are implemented by a CPU of a computer operating according to a program (visualization program).

For example, the program may be stored in the storage unit 40, with the CPU reading the program and, according to the program, operating as the reception unit 10, the learning unit 20, and the display control unit 30 (more specifically, the prediction result calculation unit 31, the performance calculation unit 32, the first display control unit 33, the second display control unit 34, and the third display control unit 35). The functions of the visualization system may be provided in the form of SaaS (Software as a Service).

The reception unit 10, the learning unit 20, and the display control unit 30 (more specifically, the prediction result calculation unit 31, the performance calculation unit 32, the first display control unit 33, the second display control unit 34, and the third display control unit 35) may each be implemented by dedicated hardware. All or part of the components of each device may be implemented by general-purpose or dedicated circuitry, processors, or combinations thereof. They may be configured with a single chip, or configured with a plurality of chips connected via a bus. All or part of the components of each device may be implemented by a combination of the above-mentioned circuitry or the like and program.

In the case where all or part of the components of each device is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-and-server system or a cloud computing system.

Figure 11:
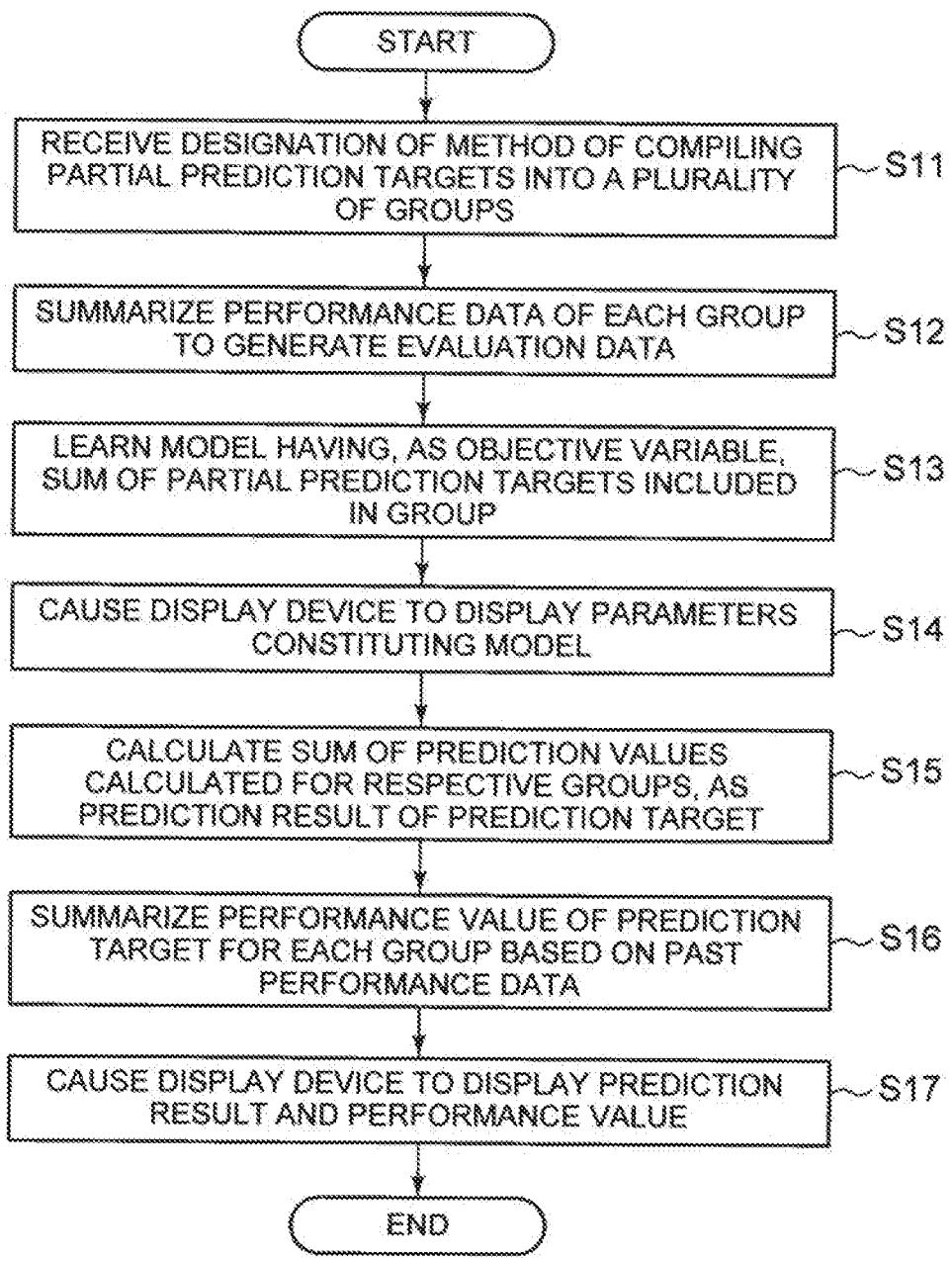
FIG. 11 is a flowchart depicting an example of operation of the visualization system.

The operation of the visualization system according to this exemplary embodiment will be described below. FIG. 11 is a flowchart depicting an example of the operation of the visualization system according to this exemplary embodiment.

The reception unit 10 receives designation of a method of compiling partial prediction targets into a plurality of groups (step S11). The learning unit 20 summarizes performance data of each group separated based on the designation, to generate evaluation data (step S12). The learning unit 20 then learns, for at least one group, a model having, as an objective variable, a sum of partial prediction targets included in the group (step S13).

The first display control unit 33 causes the display device 110 to display parameters constituting the model (step S14). Here, the prediction result calculation unit 31 may calculate a sum of prediction values calculated for the respective groups, as a prediction result of the prediction target (step S15). The performance calculation unit 32 may summarize a performance value of the prediction target for each group, based on past performance data (step S16). The second display control unit 34 may cause the display device 110 to display the prediction result calculated by the prediction result calculation unit and the performance value of each group summarized by the performance calculation unit 32 (step S17).

As described above, in this exemplary embodiment, the reception unit 10 receives designation of a method of compiling partial prediction targets into a plurality of groups, and the learning unit 20 learns, for at least one group, a model having, as an objective variable, a sum of partial prediction targets included in the group. The first display control unit 33 then causes the display device 110 to display parameters constituting the model. Thus, a basis of prediction can be visualized in the case where a desired prediction target is expressed by a sum of a plurality of prediction targets.

By using the visualization system according to this exemplary embodiment, a data analyst can determine, through trial and error, how partial prediction targets are to be combined to obtain a highly convincing prediction model, with high operability.

This exemplary embodiment describes a method whereby the learning unit 20 learns a model after the reception unit 10 receives designation of a method of compiling partial prediction targets into a plurality of groups. Alternatively, the learning unit 20 may learn a model based on a presumed group beforehand, and hold the result in the storage unit 40. With such a structure, the time until the parameters constituting the model are displayed by the display device 110 can be shortened.

Figure 12:
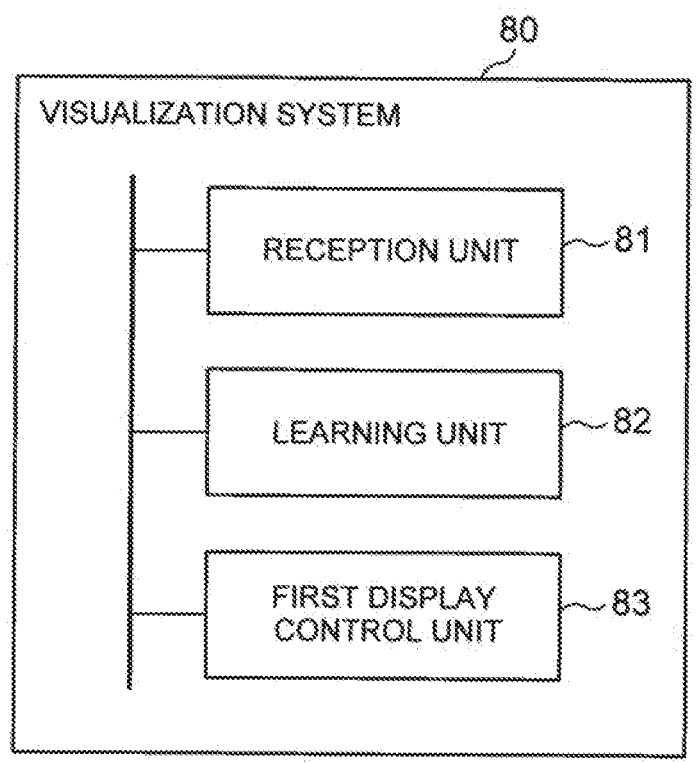
FIG. 12 is a block diagram depicting an overview of a visualization system according to the present invention.

An overview of the present invention will be given below. FIG. 12 is a block diagram depicting an overview of a visualization system according to the present invention. A visualization system 80 according to the present invention, in the case where a prediction target (e.g. prediction target Y) is expressed by a sum of a plurality of partial prediction targets (e.g. partial prediction targets $y_1, y_2, \ldots, y_n$), includes: a reception unit 81 (e.g. reception unit 10) which receives designation of a method of compiling the partial prediction targets into a plurality of groups (e.g. groups $Y_1$ and $Y_2$); a learning unit 82 (e.g. learning unit 20) which learns, for at least one of the groups, a model having, as an objective variable, a sum of partial prediction targets included in the group; and a first display control unit 83 (e.g. first display control unit 33) which causes a display device (e.g. display device 110) to display parameters constituting the model.

With such a structure, a basis of prediction can be visualized in the case where a desired prediction target is expressed by a sum of a plurality of prediction targets.

The learning unit 82 may learn a linear multiple regression model. The first display control unit 83 may cause the display device to display coefficients and explanatory variables constituting the linear multiple regression model.

Specifically, the prediction target at a time is expressed by the sum (e.g. $Y=y_1+y_2+\ldots+y_n$) of the plurality of partial prediction targets at the time.

The visualization system 80 may include: a prediction result calculation unit (e.g. prediction result calculation unit 31) which calculates a prediction value by applying prediction data to the model, and calculates a sum of prediction values of the respective groups as a prediction result of the prediction target; and a second display control unit (e.g. second display control unit 34) which causes the display device to display, as a breakdown of the prediction result, a prediction value of each group in a distinguishable form. With such a structure, more convincing combinations of partial prediction targets can be obtained.

Here, the prediction result calculation unit may calculate a prediction value of the group by applying the prediction data to the model, and use a prediction value estimated beforehand as a prediction value of a remaining group.

The visualization system 80 may include a performance calculation unit (e.g. performance calculation unit 32) which summarizes a performance value of the prediction target for each group, based on performance data. The second display control unit may cause the display device to display the summarized performance value of each group in a distinguishable form. With such a structure, the prediction result can be recognized together with changes in the performance values of the classified groups.

The second display control unit may cause the display device to display a graph having one axis as a time axis and an other axis representing the prediction target. With such a structure, the prediction result in chronological order can be recognized easily.

The visualization system 80 may include a third display control unit (e.g. third display control unit 35) which causes the display device to display an object operable through a pointing device (e.g. mouse). The third display control unit may cause the display device to display the reception unit 81 near the graph.

The foregoing exemplary embodiments can be described as, but are not limited to, the following supplementary notes.

(Supplementary note 1) A visualization system, in the case where a prediction target is expressed by a sum of a plurality of partial prediction targets, including: a reception unit which receives designation of a method of compiling the partial prediction targets into a plurality of groups; a learning unit which learns, for at least one of the groups, a model having, as an objective variable, a sum of partial prediction targets included in the group; and a first display control unit which causes a display device to display parameters constituting the model.

(Supplementary note 2) The visualization system according to supplementary note 1, wherein the learning unit learns a linear multiple regression model, and wherein the first display control unit causes the display device to display coefficients and explanatory variables constituting the linear multiple regression model.

(Supplementary note 3) The visualization system according to supplementary note 1 or 2, wherein the prediction target at a time is expressed by the sum of the plurality of partial prediction targets at the time.

(Supplementary note 4) The visualization system according to any one of supplementary notes 1 to 3, including: a prediction result calculation unit which calculates a prediction value by applying prediction data to the model, and calculates a sum of prediction values of the respective groups as a prediction result of the prediction target; and a second display control unit which causes the display device to display, as a breakdown of the prediction result, a prediction value of each group in a distinguishable form.

(Supplementary note 5) The visualization system according to supplementary note 4, wherein the prediction result calculation unit calculates a prediction value of the group by applying the prediction data to the model, and uses a prediction value estimated beforehand as a prediction value of a remaining group.

(Supplementary note 6) The visualization system according to supplementary note 4 or 5, including a performance calculation unit which summarizes a performance value of the prediction target for each group, based on performance data, wherein the second display control unit causes the display device to display the summarized performance value of each group in a distinguishable form.

(Supplementary note 7) The visualization system according to any one of supplementary notes 4 to 6, wherein the second display control unit causes the display device to display a graph having one axis as a time axis and an other axis representing the prediction target.

(Supplementary note 8) The visualization system according to supplementary note 7, including a third display control unit which causes the display device to display an object operable through a pointing device, wherein the third display control unit causes the display device to display the reception unit near the graph.

(Supplementary note 9) A visualization method, in the case where a prediction target is expressed by a sum of a plurality of partial prediction targets, including: receiving designation of a method of compiling the partial prediction targets into a plurality of groups; learning, for at least one of the groups, a model having, as an objective variable, a sum of partial prediction targets included in the group; and causing a display device to display parameters constituting the model.

(Supplementary note 10) A visualization program for, in the case where a prediction target is expressed by a sum of a plurality of partial prediction targets, causing a computer to execute: a reception process of receiving designation of a method of compiling the partial prediction targets into a plurality of groups; a learning process of learning, for at least one of the groups, a model having, as an objective variable, a sum of partial prediction targets included in the group; and a first display control process of causing a display device to display parameters constituting the model.

REFERENCE SIGNS LIST 10 reception unit
20 learning unit
30 display control unit
31 prediction result calculation unit
32 performance calculation unit
33 first display control unit
34 second display control unit
35 third display control unit
40 storage unit
100 visualization system
110 display device

The invention claimed is:

1. A visualization system, in a case where a prediction target is expressed by a sum of a plurality of partial prediction targets, comprising
a hardware processor configured to execute a software code to:
receive designation of a method of compiling the partial prediction targets into a plurality of groups;
learn, for at least one group, among the plurality of groups, a model having, as an objective variable, a sum of partial prediction targets included in the at least one group; and
cause a display device to display parameters constituting the model, wherein the hardware processor configured to execute a software code to:
calculate a prediction value of the at least one group by applying prediction data to the model, and
use a prediction value estimated beforehand as a prediction value of a remaining group, among the plurality of groups other than the at least one group,
wherein the hardware processor configured to execute a software code to:
calculate a sum of prediction values of the respective groups as a prediction result of the prediction target,
cause the display device to display, as a breakdown of the prediction result, a prediction value of each group, among the plurality of groups, in a distinguishable form,
summarize a performance value of the prediction target for each group, among the plurality of groups, based on performance data, and
cause the display device to display the summarized performance value of each group, among the plurality of groups, in a distinguishable form.

2. The visualization system according to claim 1, wherein the hardware processor configured to execute a software code to:
learn a linear multiple regression model, and
cause the display device to display coefficients and explanatory variables constituting the linear multiple regression model.

3. The visualization system according to claim 1, wherein the prediction target at a time is expressed by the sum of the plurality of partial prediction targets at the time.

4. The visualization system according to claim 1, wherein the hardware processor configured to execute a software code to cause the display device to display a graph having one axis as a time axis and another axis representing the prediction target.

5. The visualization system according to claim 4,
wherein the hardware processor configured to execute a software code to:
cause the display device to display an object operable through a pointing device; and
cause the display device to display the reception unit near the graph.

6. A visualization method, in a case where a prediction target is expressed by a sum of a plurality of partial prediction targets, comprising:
receiving designation of a method of compiling the partial prediction targets into a plurality of groups;
learning, for at least one of the groups, a model having, as an objective variable, a sum of partial prediction targets included in the group; and
causing a display device to display parameters constituting the model,
wherein the method further comprises:
calculating a prediction value of the at least one group by applying prediction data to the model,
using a prediction value estimated beforehand as a prediction value of a remaining group, among the plurality of groups other than the at least one group,
calculating a sum of prediction values of the respective groups as a prediction result of the prediction target,
causing the display device to display, as a breakdown of the prediction result, a prediction value of each group, among the plurality of groups, in a distinguishable form,
summarizing a performance value of the prediction target for each group, among the plurality of groups, based on performance data, and
causing the display device to display the summarized performance value of each group, among the plurality of groups, in a distinguishable form.

7. A non-transitory computer readable information recording medium storing a visualization program, in a case where a prediction target is expressed by a sum of a plurality of partial prediction targets, when executed by a processor, that performs a method comprising:
receiving designation of a method of compiling the partial prediction targets into a plurality of groups;
learning, for at least one of the groups, a model having, as an objective variable, a sum of partial prediction targets included in the group; and
causing a display device to display parameters constituting the model,
wherein the method further comprises:
calculating a prediction value of the at least one group by applying prediction data to the model,
using a prediction value estimated beforehand as a prediction value of a remaining group, among the plurality of groups other than the at least one group, calculating a sum of prediction values of the respective groups as a prediction result of the prediction target, causing the display device to display, as a breakdown of the prediction result, a prediction value of each group, among the plurality of groups, in a distinguishable form, summarizing a performance value of the prediction target for each group, among the plurality of groups, based on performance data, and causing the display device to display the summarized performance value of each group, among the plurality of groups, in a distinguishable form.

* * * * *